Patented Jan. 31, 1939

2,145,259

UNITED STATES PATENT OFFICE 2,145,259

SULPHUR COMPOSITION

Sheldon B. Heath, Midland, Mich., assignor to The Dow Chemical Company, Midland, Mich., a corporation of Michigan No Drawing. Application February 1, 1938, Serial No. 188,111

9 Claims. (Cl. 167—20)

This invention relates to a new composition of matter comprising finely divided sulphur and a relatively small amount of an organic nitro-compound.

Finely divided sulphur, as well as various compositions consisting principally thereof, have had wide application for the control of fungus diseases of plants, and for other purposes. In many cases, however, sulphur preparations heretofore known have proved to be ineffective.

I have now found that the addition to finely divided sulphur of a small amount of an organic nitro-compound, which is intimately incorporated with the sulphur, very greatly increases the activity of the sulphur against fungus, and that such increase of activity is all out of proportion to any activity that may be ascribed to the nitro-compound itself. It is known that certain organic nitro-compounds have been tested for use in plant sprays and the like, but owing to their toxic action toward both plant and animal tissue such use has not been successful, since at any strength suitable for disease control the nitro-compound is destructive to the host, whether plant foliage or the skin of animals. In combination with sulphur, however, as I have found, a minute amount of nitro-compound, insufficient in itself to affect tissue or any fungus disease thereof, enhances the fungicidal action of the sulphur to a remarkable degree. Apparently the nitro-compound acts as an activator for the sulphur, although the exact nature of the action has not been definitely ascertained. In any case the new sulphur compositions of the invention have been found useful for the control of parasites against which sulphur itself is largely ineffective.

According to the invention a small proportion of an organic nitro-compound is intimately mixed with powdered sulphur in any suitable manner, although naturally it is desirable to secure a high degree of dispersion of the nitro-compound in the mass. A preferred method of incorporating the nitro-compound consists in dissolving it in the molten sulphur and emulsifying the molten sulphur by agitating with hot water in the presence of an emulsifying agent which is non-reactive with the nitro-compound. The finely powdered sulphur product is separated from the water and dried. The molten sulphur containing the nitro-compound can also be allowed to solidify in a solid mass, which is crushed and ground by mechanical means. The nitro-compound may be added to the sulphur in amounts up to 10 per cent by weight of the sulphur or thereabout, but in most cases 1 per cent or less will suffice. The actual proportions used in any case will vary with the particular nitro-compound, and the specific use for which the composition is intended. When used as a horticultural dust or spray I have found it desirable to limit the amount of nitro-compound approximately to that which will dissolve in molten sulphur and remain in solid solution therein when the sulphur is solidified. Practically the amount of the organic nitro-compound incorporated into or with the sulphur varies from about 0.1 to about 10 per cent by weight of the mixture, but any suitable concentration thereof in the composition is included within the scope of the invention.

Among the organic nitro-compounds which may be used in accordance with the invention are aliphatic nitro-compounds, such as nitro-paraffins, nitro-alcohols, etc.; aromatic nitro-compounds, such as nitro-benzenes, nitro-toluene, nitro-naphthalene, nitro-diphenyls, nitro-anilines, nitro-phenols, nitro-naphthols, etc.; and heterocyclic nitro-compounds, such as nitro-thiophene, nitro-pyridine, nitro-quinoline, etc., or mixtures thereof.

Various inert wetting and/or dispersing agents such as sulphite waste products, sulphonated hydrocarbons, naphthenate derivatives, blood albumin, etc., may be incorporated in my new compositions, either during or following their preparation, to improve their wetting characteristics.

The following examples describe the preparation and testing of certain representative compositions, but are not to be construed as limiting the invention:

Varying amounts of 2.4-dinitro-6-cyclohexyl-phenol were dissolved in molten sulphur and the resultant solutions solidified by cooling and thereafter ground in a ball mill with a solid wetting agent, until the maximum particle size of the finely divided product was 10 microns or less. According to this procedure, dusts having the following percentage compositions by weight were prepared:

Composition A

| | Percentage by weight |
|---|---|
| 2.4-dinitro-6-cyclohexyl-phenol | 0.25 |
| Wetting agent | 2.5 |
| Sulphur | 97.25 |

Composition B

| | |
|---|---|
| 2.4-dinitro-6-cyclohexyl-phenol | 0.5 |
| Wetting agent | 1.5 |
| Sulphur | 98.0 |

*Composition C*

| | Percentage by weight |
|---|---|
| 2.4-dinitro-6-cyclohexyl-phenol | 4.4 |
| Wetting agent | 11.0 |
| Sulphur | 84.6 |

*Composition D*

| | |
|---|---|
| 2.4-dinitro-6-cyclohexyl-phenol | 8.0 |
| Wetting agent | 11.0 |
| Sulphur | 81.0 |

Tests were carried out with the above compositions and sulphur alone against a number of insects and fungi to determine the comparative effectiveness of the mixtures. The following procedure was followed in testing against *Macrosporium solani* (early potato blight):

The compositions to be tested were suspended in water in various proportions, with sufficient agitation to form a substantially homogeneous dispersion. The resultant mixtures were applied as a fine uniform spray to one surface of standard 3" x 1" clean glass slides under a regulated pressure of 15 to 20 pounds. The slides were then air-dried for several hours, and three wells made with rings of Vaseline upon the treated glass surface of each. The test organism was prepared by suspending the spores of *Macrosporium solani*, secured from 5 to 7 day-old cultures on potato dextrose agar, in an aqueous 0.1 per cent dextrose solution. Two drops of this test suspension, each drop containing 75 to 100 spores, were then introduced into each Vaseline well and the slides stored on glass racks in moist chambers for 24 to 72 hours, at temperatures averaging 70–75° F. At the end of this incubation period the percentage of germinated spores in each well was determined by inspection through a low-power microscope and compared with the per cent germination shown by a check experiment run simultaneously. The per cent control was calculated in the usual manner from the formula $$\frac{(X-Y)}{X}(100)$$

in which X represents the per cent germination in the control or check run and Y represents the per cent germination determined in the presence of the test material.

The data included in the following table is illustrative of the results obtained:

| Material tested | Dilution in lbs./100 gals. of water | Per cent germination | Per cent control |
|---|---|---|---|
| Check | | 93 | |
| Sulphur* | 2 | 93 | 0.0 |
|  | 4 | 89 | 4.3 |
|  | 8 | 86 | 7.5 |
| Check | | 89 | |
| Composition A | 2 | 76 | 14.6 |
|  | 4 | 17 | 80.8 |
| Check | | 89 | |
| Composition B | 2 | 79 | 11.2 |
|  | 4 | 5 | 94.4 |
| Check | | 89 | |
| Composition C | 2 | 78 | 12.4 |
|  | 4 | 30 | 66.2 |
| Check | | 89 | |
| Composition D | 2 | 77 | 13.5 |
|  | 4 | 38 | 57.2 |
| 2.4-dinitro-6-cyclohexyl-phenol | At 0.04% in water. | | Less than 5.0 |

* This sulphur contained 2.0% of a wetting agent and corresponded in particle size with the other mixtures tested.

From the above data it is evident that the addition of a relatively small percentage of the nitrophenol to sulphur enormously increases the fungicidal effect of the latter, although the nitrophenol itself in comparable concentration was no more effective than sulphur alone.

Standard toxicological tests carried out against other fungi, e. g. *Venturia inaequalis*, etc.; insect eggs, e. g. ova of Lygaeus Kalmii Stal., etc.; codling moth larvae; San Jose scale; etc., also showed the superiority of sulphur-organic nitroderivative compositions to both sulphur and the organic nitro-ingredient alone. The compositions were tested both as dusts and as water suspensions.

Other compositions were prepared by first dissolving an organic nitro-derivative in molten sulphur, adding thereto a wetting agent, and solidifying the resultant mixture by cooling. This product was broken up into chunks, a small amount of water added thereto, and ground wet in a ball mill. The resulting finely divided paste was in some instances dried and used as a dust and in others diluted with additional water and applied for parasite control in the form of a dilute water suspension. The following compositions were representative of those prepared and found useful for the purposes previously mentioned:

| | Percentage by weight |
|---|---|
| 2.4-dinitro-6-cyclohexyl phenol | 0.1 |
| Wetting agent | 7.00 |
| Sulphur | 92.9 |
| Picric acid (2.4.6-tri-nitro-phenol) | 0.125 |
| Wetting agent | 7.00 |
| Sulphur | 92.875 |
| 1.3-dinitro-benzene | 0.25 |
| Wetting agent | 7.00 |
| Sulphur | 92.75 |
| 1.3.5-trinitro-benzene | 0.25 |
| Wetting agent | 7.00 |
| Sulphur | 92.75 |
| Dinitro-cresol | 0.25 |
| Wetting agent | 7.00 |
| Sulphur | 92.75 |

Compositions may likewise be prepared according to the outlined procedures, or the equivalent, containing other organic nitro-compounds, such as nitro-thiophene, ortho-nitro-phenol, nitroethyl alcohol, nitro-octane, dinitro-alpha-naphthol, dinitro-diphenyl, tetra-nitro-diphenyloxide, nitro-aniline, etc.

The new compositions of the invention may be applied as dusts or water suspensions, or in ointments, etc. They may likewise be used in conjunction with other parasiticides which are compatible therewith, or in admixture with an inert carrier, as, for instance, talc, bentonite, diatomaceous earth, etc.

The present application is a continuation in part of my co-pending application, Serial No. 80,416, filed May 18, 1936.

Other ways of applying the principle of my invention may be employed instead of those explained, change being made as regards the materials or amounts thereof employed, provided the products claimed in the following claims be thereby obtained.

I therefore particularly point out and distinctly claim as my invention:—

1. An insecticidal and fungicidal composition comprising finely divided sulphur and from about 0.1 per cent to about 10 per cent by weight of an organic nitro-compound.

2. An insecticidal and fungicidal composition comprising finely divided sulphur and from about 0.1 per cent to about 10 per cent by weight of an aromatic nitro-compound.

3. An insecticidal and fungicidal composition comprising finely divided sulphur and from about 0.1 per cent to about 10 per cent by weight of a nitro-phenol.

4. An insecticidal and fungicidal composition comprising finely divided sulphur and from about 0.1 per cent to about 10 per cent by weight of 2.4-dinitro-6-cyclohexyl-phenol.

5. An insecticidal and fungicidal composition comprising finely divided sulphur and from about 0.1 per cent to about 10 per cent by weight of dinitro-cresol.

6. An insecticidal and fungicidal composition comprising finely divided sulphur having incorporated therewith from 0.1 per cent to 1 per cent by weight of an aromatic nitro-compound.

7. An insecticidal and fungicidal composition comprising finely divided sulphur having incorporated therewith from 0.1 per cent to 1 per cent by weight of a nitro-phenol.

8. An insecticidal and fungicidal composition comprising finely divided sulphur having incorporated therewith from 0.1 per cent to 1 per cent by weight of 2.4-dinitro-6-cyclohexyl-phenol.

9. An insecticidal and fungicidal composition comprising finely divided sulphur having incorporated therewith from 0.1 per cent to 1 per cent by weight of dinitro-cresol.

SHELDON B. HEATH.